US010384293B2

(12) United States Patent
Peters et al.

(10) Patent No.: US 10,384,293 B2
(45) Date of Patent: Aug. 20, 2019

(54) METHOD AND APPARATUS FOR HEAVY PLATE JOINING WITH HYBRID LASER AND SUBMERGED-ARC WELDING PROCESS

(75) Inventors: Steven R. Peters, Huntsburg, OH (US); Patrick Wahlen, Jupiter, FL (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 1213 days.

(21) Appl. No.: 13/098,047

(22) Filed: Apr. 29, 2011

(65) Prior Publication Data

US 2012/0273466 A1 Nov. 1, 2012

(51) Int. Cl.
| | |
|---|---|
| *B23K 9/18* | (2006.01) |
| *B23K 26/26* | (2014.01) |
| *B23K 28/02* | (2014.01) |
| *B23K 101/18* | (2006.01) |
| *B23K 26/211* | (2014.01) |
| *B23K 26/348* | (2014.01) |

(52) U.S. Cl.
CPC ............ *B23K 9/188* (2013.01); *B23K 26/211* (2015.10); *B23K 26/26* (2013.01); *B23K 26/348* (2015.10); *B23K 28/02* (2013.01); *B23K 2101/18* (2018.08)

(58) Field of Classification Search
CPC ... B23K 2201/26; B23K 9/0026; B23K 9/038
USPC ... 219/54–58, 69.1, 69.11, 73.2, 73.21, 76.1, 219/76.12, 121.11–121.86
See application file for complete search history.

(56) References Cited

U.S. PATENT DOCUMENTS

| | | | | |
|---|---|---|---|---|
| 3,200,232 | A * | 8/1965 | Danhier | .................... 219/73.1 |
| 4,975,558 | A * | 12/1990 | Lukens | .................... B23K 9/08 |
| | | | | 219/123 |
| 6,884,959 | B2 * | 4/2005 | Gandy | .................... B23K 9/188 |
| | | | | 219/73.21 |
| 2003/0052110 | A1 * | 3/2003 | Gandy | .................... B23K 9/188 |
| | | | | 219/137.7 |

(Continued)

FOREIGN PATENT DOCUMENTS

| | | |
|---|---|---|
| CN | 1751834 A | 3/2006 |
| CN | 101032788 A | 9/2007 |

(Continued)

OTHER PUBLICATIONS

Machine translation of WO2011972734; Oct. 2014.*

(Continued)

*Primary Examiner* — Tu B Hoang
*Assistant Examiner* — Thomas J Ward

(57) ABSTRACT

A welding system and method is provided for welding heavy plate, where the method and device include using a laser which directs a beam to a first weld puddle to weld at least a portion of a work piece and a welding torch to direct a first welding electrode to the first weld puddle while the beam is being directed to the weld puddle. The welding torch deposits the first welding electrode to create a first weld bead. A flux nozzle is employed to deposit a welding flux onto the weld bead, and a submerged arc welding torch is used to direct a submerged arc filler metal to the weld bead to create a second weld bead through a submerged arc welding process, where the submerged arc welding process melts a portion of the first weld bead to consume the melted portion into the second weld bead.

19 Claims, 4 Drawing Sheets

(56) References Cited

U.S. PATENT DOCUMENTS

2007/0013471 A1* 1/2007 Minami ............... B23K 26/206
336/225
2010/0320174 A1* 12/2010 Hybinette ............ B23K 9/0284
219/74

FOREIGN PATENT DOCUMENTS

| JP | 2004-306084 A | 11/2004 | | |
|----|----|----|----|----|
| JP | 2004306084 A | 11/2004 | | |
| JP | 2007283363 | 11/2007 | | |
| JP | 2008168319 | 7/2008 | | |
| JP | 2013-514181 A | 4/2013 | | |
| JP | 2013514181 A | 4/2013 | | |
| WO | WO2011072734 | * 12/2009 | ......... | B23K 26/1429 |
| WO | WO2011072734 | 6/2011 | | |
| WO | WO2011972734 | * 6/2011 | | |
| WO | 2012146975 A1 | 11/2012 | | |

OTHER PUBLICATIONS

J. Tuseket AL; "Hybrid Welding with Arc and Laser Beam"; Oct. 1, 1999; XP009071730; pp. 308-311.
International Search Report and Written Opinion for Application No. PCT/IB2012/000821, dated Sep. 13, 2012,11 pages.
Chinese Patent Application No. 201280021070.4, Office Action, 20 pages, dated Apr. 3, 2015.
Japanese Patent Application No. 2014-503227, Office Action, 6 pages, dated Aug. 12, 2014.

* cited by examiner

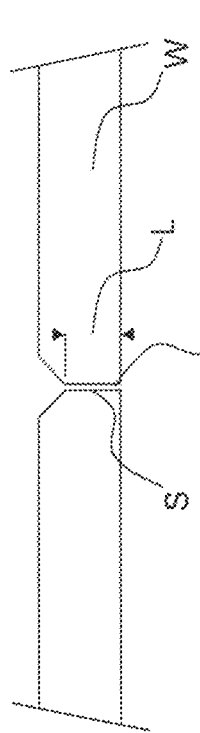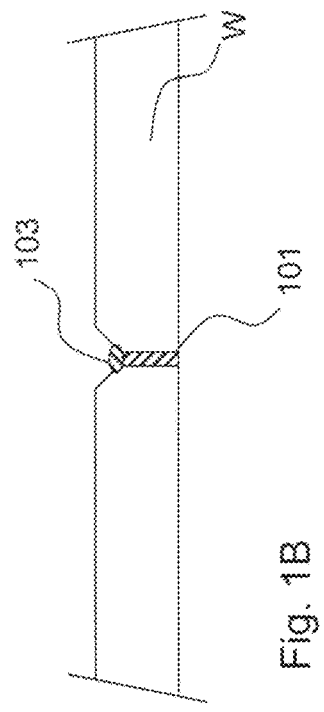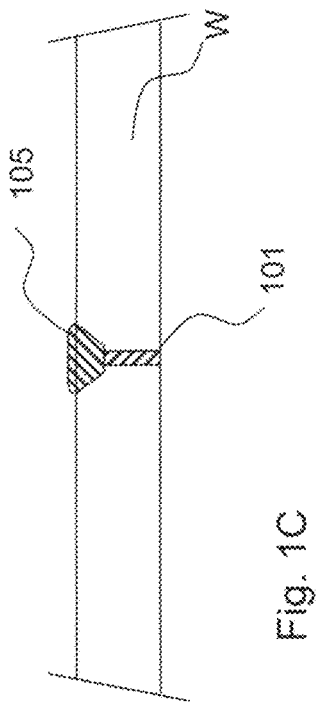

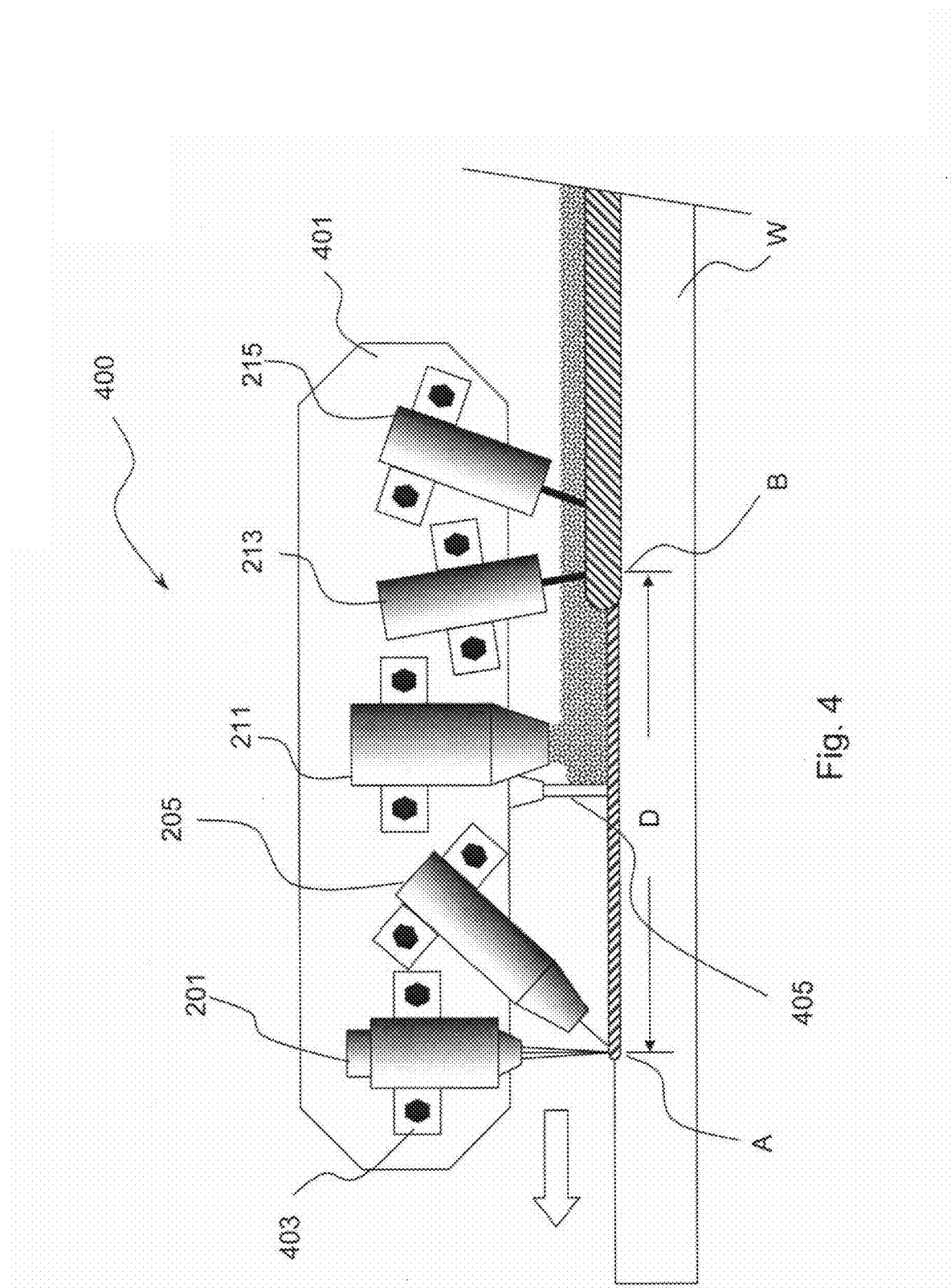

METHOD AND APPARATUS FOR HEAVY PLATE JOINING WITH HYBRID LASER AND SUBMERGED-ARC WELDING PROCESS

BACKGROUND OF THE INVENTION

Field of the Invention

Devices, systems, and methods consistent with the invention relate to heavy plate joining with hybrid laser and submerged arc welding processes.

Description of the Related Art

There are many industries which require welding work pieces having a thickness of 0.5 inches or more. This welding is often called heavy plate welding. Such industries include ship building and pipeline construction, for example. However, when welding heavy plate work pieces it is necessary to utilize a significant amount of filler metal to obtain a suitable joint. Because of this it is often necessary to make several passes over the joint to ensure the sufficiency of a weld deposit. This increases the overall labor time involved in creating the joint. Further, depending on the processes used the speed at which the joint can be welded may be limited. For example, certain welding processes may cause cracking or other defects in the weld joint if the travel speed of the welding process is too high. Because of at least these disadvantages it is desirable to have a welding system and process which can provide a high deposition rate and provide a suitable weld, when welding work pieces having a thickness of 0.5 inches or more.

BRIEF SUMMARY OF THE INVENTION

An exemplary embodiment of the present invention is a method and device for welding heavy plate work pieces, where the method and device include using a laser welding device which directs a laser beam to a first weld puddle of the work piece to weld at least a portion of the work piece and a welding torch located adjacent to the laser welding device so as to direct a first welding electrode to the first weld puddle while the laser beam is being directed to the weld puddle. The welding torch deposits the first welding electrode to create a first weld bead onto the portion welded by the laser welding device. A flux nozzle is employed to deposit a welding flux onto the first weld bead, and at least one submerged arc welding torch is used to direct a submerged arc filler metal to the first weld bead to create a second weld bead through a submerged arc welding process, where the submerged arc welding process melts at least a portion of the first weld bead to consume the melted portion into the second weld bead.

BRIEF DESCRIPTION OF THE DRAWINGS

The above and/or other aspects of the invention will be more apparent by describing in detail exemplary embodiments of the invention with reference to the accompanying drawings, in which:

FIGS. 1A to 1C illustrate a diagrammatical representation of a cross-section of an exemplary weld joint used with exemplary embodiments of the present invention;

FIG. 4 illustrates a diagrammatical representation of an exemplary embodiment of a welding carriage assembly in accordance with an exemplary embodiment of the present invention.

DETAILED DESCRIPTION OF EXEMPLARY EMBODIMENTS

Figure 2:
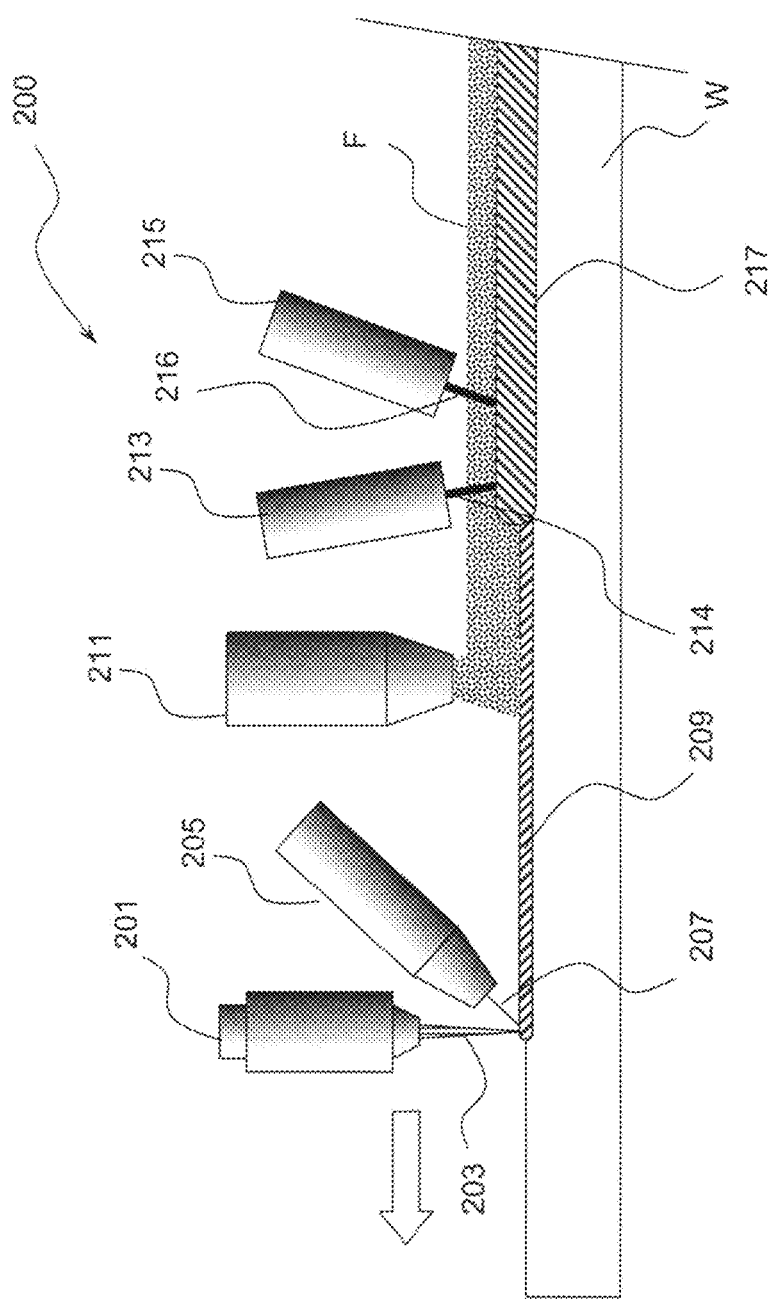
FIG. 2 illustrates a diagrammatical representation of an exemplary embodiment of a welding apparatus of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

FIGS. 1A through 1C depict a cross-section of an exemplary weld joint made with exemplary embodiments of the present invention. In the exemplary joints shown in FIGS. 1A to 1C a butt-type joint is shown, but the present invention is not specifically limited to use on only these types of joints and can be used in other types of welding joints. Various exemplary embodiments of the present invention are utilized on welds where the work pieces W to be welded have a thickness of 0.5 inches or more at the weld joint. In FIGS. 1A through 1C a land height L is shown which is the height of the opposing surfaces S of the work pieces W which are substantially parallel with each other. In an exemplary embodiment of the present invention the land height L can represent the entire thickness of the work pieces W. Alternatively, in other exemplary embodiments, the land height L is less than the thicknesses of the work pieces W. For example, if the thickness of the work pieces is 0.75 inches the land height can be 0.5 inches and the remaining 0.25 inch is in the form of a V-notch groove as shown in FIGS. 1A to 1B.

In exemplary embodiments of the present invention a gap G may exist between the opposing surfaces S of the work pieces W. However, in other exemplary embodiments the work pieces W can be in flush contact with each other. In some exemplary embodiments the gap G can be in the range of 1 to 10 mm.

Further, although FIGS. 1A through 1C shown the work pieces W having the same thickness, the present invention is not limited in this regard as exemplary embodiments of the present invention can be utilized to join work pieces of varying thickness.

Exemplary embodiments employ a combination of welding processes/systems to optimize welding performance when joining heavy plates. This will be discussed briefly with respect to FIGS. 1B and 1C and will be discussed in more detail with respect to FIGS. 2 through 4.

As briefly discussed above, FIG. 1A depicts an exemplary welding joint which can be welding with embodiments of the present invention where the land height L is less than the thickness of the work pieces W and a gap G exists between the surfaces S. The surfaces S are substantially parallel to each other along the land height L. It is noted that aspects of the present invention are not limited by the material composition of the work pieces W which can be, for example mild or high strength steels.

FIG. 1B depicts the weld joint of FIG. 1A in which the first filler pass of the welding process has been completed. Specifically, in exemplary embodiments of the present invention this first filler pass is completed via a hybrid laser-GMAW welding process. GMAW is gas-metal arc welding and is commonly referred to as MIG or metal inert gas welding. To complete this first filler pass a laser beam is utilized because of its high penetration depth. The laser is utilized to provide a laser weld 101 for the majority of the height of the land L in the weld joint. The laser can precisely weld the work pieces along the land L because of its energy density and the level of precision and focus provided by a laser. As such, the laser welding provides a focused penetration to the bottom, or nearly the bottom, of the weld. Simultaneously with the laser welding, a GMAW welding process is utilized to provide a GMAW weld bead 103 on the top of the laser weld 101. The utilization of the GMAW process with the laser welding provides for the addition of filler material into the weld and the filler metal from the GMAW process helps to focus the laser for purposes of the laser welding. Further, to the extent a gap G exists in the joint to be welded, the GMAW process provides the necessary filler material to allow this gap to be sufficiently filled and properly welded during the hybrid laser welding process. Further, the use of a GMAW/MIG welding process allows the addition of particular alloys to the weld bead for a desirable weld profile and mechanical properties.

The above described process is generally known as hybrid laser-GMAW welding, and is generally known to those of ordinary skill in the art. As such, it is not necessary to discuss the details of such a welding operation herein.

It is noted that throughout this application there is reference to hybrid laser-GMAW welding. However, the present invention is not specifically limited to the use of GMAW or MIG welding with the laser system, other welding systems can be used. For example, other types of welding can be used, including (but not limited to) metal active gas (MAG) welding and metal cored arc welding (MCAW). These alternative welding processes have different properties and advantages that may be advantageous depending on the desired welding parameters and can be used in conjunction with a hybrid laser system. Therefore, although the remainder of the discussion in this application refers to GMAW or MIG, this is done for simplicity and efficiency and is not intended to exclude other types of welding processes, such as MAG or MCAW.

When welding heavy plate work pieces, such as those contemplated by aspects of the present invention, the utilization of hybrid laser GMAW welding processes by themselves have limitations, including but not limited to performance speeds (e.g., deposition rates and travel speeds), and weld quality issues. For example, because of the nature of the hybrid laser-GMAW welding process there is limited side wall penetration of the weld into the work pieces W. Thus, in exemplary embodiments of the present invention this first filler pass is followed by a second filler pass of submerged arc welding (SAW).

FIG. 1C shows the weld joint after the second filler pass of submerged arc welding (SAW, or sub-arc welding). Sub-arc welding is a known welding process in which typically a larger diameter welding electrode (e.g., 5/32") is utilized and the welding arc is shielded from the outside atmosphere by a granular welding flux. Because those of ordinary skill in the art are familiar with the sub-arc welding and its processes it is unnecessary to include a detailed description herein.

The sub-arc welding process is utilized after the first filler pass because of its generally high deposition rates at high speed and because of its improved side wall penetration characteristics over GMAW type processes. Furthermore, the use of a sub-arc welding process flattens out and generally provides an improved weld bead 105 on the work pieces W. The improved sidewall penetration from the sub-arc welding process aids in providing the desired weld profile and mechanical properties, which can not be achieved with only a GMAW type process. During the second filler pass the sub-arc welding process penetrates the GMAW weld bead 103 such that at least a portion of the GMAW weld bead is consumed into the sub-arc weld bead 105. Stated differently, the sub-arc weld bead 105 penetrates into the GMAW weld bead 103 such that at least a portion of the GMAW weld bead 103 is no longer discernable from the sub-arc weld bead 105. That is, at least some of the filler metal from the first pass is re-melted in the sub-arc welding pass such that the filler metal from the first pass is absorbed into the filler metal of the sub-arc pass. This re-melting (or reclamation) of the first pass weld bead is beneficial for creating an optimal final weld bead with an improved weld profile and mechanical properties.

In another exemplary embodiment, over 50% of the cross-sectional area of the GMAW weld bead 103 is consumed by the sub-arc welding process and bead 105. In a further exemplary embodiment, the depth of penetration of the sub-arc welding process and bead 105 is such that in consumes 100% of the cross-sectional area of the GMAW weld bead 103. In such an embodiment the depth of the sub-arc weld bead 105 penetration is such that the bead 105 directly contacts the laser welding weld bead 101. Thus, all of the filler metal from the first pass is re-melted and absorbed into the weld bead of the sub-arc welding process. In such an embodiment no discernable or distinct GMAW weld bead 103 will remain after the second pass.

The combination of the first filler and second filler passes discussed above, in thick work pieces, provides a welded joint having a precise and sufficient depth of penetration, while at the same time providing significant side wall penetration. Thus the combination of the first and second filler passes provides a more refined and optimal weld bead in work pieces having a thickness of 0.5 inches or more. Furthermore, in addition to having improved weld quality, significant welding efficiencies can be achieved. For example, exemplary embodiments of the present invention can weld at speeds of at least 60 inches per minute. Further exemplary embodiments can weld at speeds of at least 80 inches per minute. Additionally, the overall deposition rate of the welding operation can be significantly improved. Some prior art systems for heavy plate welding can deposit up to about 30 lb/hour (rate of filler metal deposition). However, this deposition rate is not sufficient for many heavy plate welding operations, thus requiring many additional passes of depositing filler metal—greatly increasing the cost and decreasing throughput potential in making such welds. Exemplary embodiments of the present invention can achieve deposition rates of at least 40 lb/hour, and further exemplary embodiments can achieve deposition rates of at least 50 lb/hour. Such deposition rates can easily sufficiently fill a heavy plate weld joint in a single pass, significantly reducing welding time and the overall energy input into a weld joint.

Additional advantages employing exemplary embodiments of the present invention include having to only weld the heavy plates from a single side, low work piece distortion, low heat input for the relative travel speeds and deposition rates and narrow heat affected zones on the work piece. Furthermore, embodiments of the present invention greatly decrease the costs of heavy plate welding because the use of sub-arc welding processes (having such high deposition rates) means that the land height L of the weld joint can be reduced, thus reducing the laser power required, reducing the cost of the laser device.

In an exemplary embodiment of the present invention, the filler metals (i.e., electrodes) for the GMAW first pass is the same as that used for the sub-arc welding second pass. However, in other exemplary embodiments of the present invention the filler metals for the respective passes have a different composition. For example, it is contemplated that the GMAW filler metal is a mild steel alloy, such as ER70S type electrodes, while the sub-arc filler metal is a high strength electrode, for example a LA100 wire which can be used with a MIL800H flux. Such a combination can provide an optimal weld profile depending on the composition/material type of the work pieces W. It is noted that the present invention is not limited to the use of the above identified electrodes and flux, which was identified as exemplary.

Turning now to FIG. 2, an exemplary embodiment of a welding apparatus 200 is depicted welding on a work piece W. The apparatus 200 contains a laser device 201 of a type typically used in laser welding operations. The laser device 201 is located at the leading edge of the travel direction of the apparatus 200 and provides a beam 203 to the work piece W. Although aspects of the present invention are not limited by the type or construction of the laser 201, the laser device 201 should be of a type capable of precisely welding the land L area of the work pieces W and provide sufficient penetration capability so as to provide a sufficient laser weld to at or near the full depth of the weld joint. For example, see the land height L in FIG. 1B. In an exemplary embodiment the laser device 201 has a power in the range of 6 to 20 kW, while in other exemplary embodiments the laser device 201 has a power in the range of 10 to 20 kW. Of course, higher power lasers can be used but as the power level increases, so does the cost of the laser. Advantages of the present invention is that very thick plate welding can be accomplished at high speed with a lesser power laser than would normally be employed. In exemplary embodiments of the present invention, the laser device 201 should have the power and ability to create a "keyhole" in the work piece W. That is, the laser device 201 should have a sufficient energy density to make a hole through the thickness of the work piece W to be welded by the laser 201 (for example, the land height L), and maintain that level of penetration during the creation of the weld joint. In exemplary embodiments of the present invention, laser devices 201 capable of providing sufficient "keyhole" in the work piece W have an energy density in the range of $10^6$ to $10^7$ watts/cm$^2$.

In further exemplary embodiments, the laser device 201 has a focusable/adjustable beam lens which permits manual and/or automatic adjustment of the beam 203 size and/or density so as to be adjustable for varying welding operations. In the depicted exemplary embodiment, the laser device 201 is positioned such that the beam 203 is emitted normal to the upper surface of the weld. However, embodiments of the present invention contemplate angling the device 201 such that the beam 203 impinges the work piece W at an angle. In exemplary embodiments of the present invention, the laser device 201 is positioned such that the beam 203 impinges the weld puddle at the approximate center of the weld puddle.

The apparatus 200 shown in FIG. 2 also includes a GMAW (or MIG) welding torch 205 positioned in a trailing position adjacent to the laser device 201. (As stated earlier, in some exemplary embodiments, other types of welding and welding torches can be used instead of GMAW or MIG, including but not limited to MAG or MCAW). The torch 205 delivers the first filler electrode 207 to the weld joint via a GMAW/MIG welding process to create a weld bead 209 (see also item 103 in FIG. 1B). In the depicted exemplary embodiment the torch 205 is positioned such that the first filler metal 207 (welding electrode) is delivered to the weld at an angle with respect to the surface of the weld. That is, the laser beam 203 and the filler metal 207 are not parallel to each other. The angling between the beam 203 and the filler metal 207 is to be optimized, but can be in the range of 30 to 60 degrees between the centerline of the beam 203 and the centerline of the filler metal 207. In an exemplary embodiment of the present invention, the positioning of the torch 205 is such that the GMAW/MIG welding process is depositing the filler metal 207 into the same molten weld puddle to which the beam 203 is directed. That is, the laser device 201 and the torch 205 are sharing a weld puddle. In another exemplary embodiment, the torch 205 is positioned such that at least a portion of the beam 203 impinges on the filler metal 207 during the welding process. Such positioning aids in focusing the beam 203 to achieve optimal penetration and weld quality of the land L. The stick out of the filler metal 207 and the shielding gas (if any) to be applied is to be optimized based on desired performance criteria of the weld.

Furthermore, the GMAW/MIG welding process facilitated by the torch 205 can be of any known type of welding operation. For example, some exemplary embodiments can utilize a pulse welding process, while other exemplary embodiments can employ a surface tension transfer type welding process.

In the exemplary embodiment depicted in FIG. 2, the torch 205 and laser device 201 are positioned on a common centerline in the travel direction of the welding operation—that is the components are directly in line with each other.

Although FIG. 2 depicts the torch 205 in a trailing position it is noted that in other exemplary embodiments of the present invention the welding torch 205 can be leading the laser device 201 during welding. That is, the orientation of the torch 205 and laser device 201 in FIG. 2 can be reversed. In yet a further exemplary embodiment, a dual or tandem torch configuration can be used, where two welding torches 205 are utilized to, create a larger first pass weld bead. For example, both a leading and trailing torch 205 can envelope the laser device 201 (positioned in between the torches 205). Such a configuration can be used when the joint gap G is large. Because a large gap G will require more filler material in the first pass it may be needed to use a dual torch configuration for the first pass.

Following the torch 205 is a flux nozzle 211 which delivers a welding flux F to the weld. The flux nozzle 211 and flux F can be of any known type utilized for sub-arc welding processes. The nozzle 211 is positioned in-line and behind the torch 205 such that the flux F does not interfere with the operation of the torch 205 or laser 201, but to provide the flux for the sub-arc welding processes. It is noted that it is also common to have the flux deposited around the sub-arc filler metals during welding as opposed to fully prior. Either embodiment can be utilized in embodiments of the present invention.

Following the nozzle 211 is at least one sub-arc welding torch 213 which delivers a sub-arc filler metal 214 to the work piece for a sub-arc welding process. The at least one sub-arc torch 214 is positioned in-line (in the travel direction) behind the nozzle 211 such that the flux F provides sufficient shielding for the sub-arc welding process. In the embodiment shown in FIG. 2 a first (213) and second (215) sub-arc torch is provided—creating a tandem sub-arc welding configuration. However, the present invention is not limited in this regard, as a single sub-arc torch 213 can be utilized—depending on the demands of the welding operation. Further, in additional exemplary embodiments more than two sub-arc torches can be utilized, for example it is contemplated that three sub-arc torches can be positioned in-line with each other. It is also contemplated that additional sub-arc torches can be utilized. Logically, by increasing the number of sub-arc torches utilized the overall deposition rate is increased.

As shown in FIG. 2, the torches 213/215 create a sub-arc weld bead 217 under the flux F as in typical sub-arc welding processes. (This is also shown in FIG. 1C—item 105).

In FIG. 2 the torches 213 and 215 are angled with respect to the weld and are angled such that the respective fillers 214 and 216 are directed towards each other. In this configuration the filler metals 214 and 216 are directed such that they share a common weld puddle during the welding operation. In other exemplary embodiments, other orientations can be utilized. For example, in a single torch embodiment the torch 213 can be oriented normal to the surface of the weld. Further, in tandem configurations, having more than one sub-arc torch, at least one of the torches can be oriented normal to the weld, while the other(s) are angled, while still sharing the same weld puddle. For example, the lead torch 213 is positioned such that the lead filler metal 214 is normal to the weld bead, while the trailing torch 215 is angled such that the trailing filler metal 216 is angled between 10 and 80 degrees to the lead filler metal 214.

In exemplary embodiments of the present invention, the angling of the sub-arc torches 213 and 215 is such that the theoretical convergence point between the respective sub-arc filler metals 214 and 216 is below the maximum depth of the sub-arc weld bead 217. In some embodiments, the convergence point is just below the depth of the weld bead 217. By angling the filler metals 214/216 with such a theoretical convergence point an optimal distance between the lead sub-arc filler metal 214 and trailing sub-arc filler metal 216 is attained.

In exemplary embodiments of the present invention using more than one sub-arc filler 214/216 the composition of the fillers 214/216 are the same. However, in other exemplary embodiments the compositions of the respective fillers 214/216 can be different. That is, it is possible to use electrodes having varying, yet compatible, compositions to obtain a blended weld bead, if desirable. For example, in an embodiment the lead filler metal 214 can be a metal cored wire, while the trailing filler 216 is a solid wire. The use of the metal core filler metal can provide a higher fill rate while using less current. Alternatively, in other embodiments either the trailing wire or both the lead and trailing filler metals can be metal cored. The use of metal cored filler metals can result in the deposition of more filler metal with less current than solid wires, depending on the welding operation. Additionally, in some exemplary embodiments the size (diameter) of the lead and trailing electrodes are different. For example, the lead electrode 214 can have a larger diameter than the trailing electrode.

In another exemplary embodiment of the present invention, not shown, a twin-arc sub-arc welding process can be employed. Twin-arc welding utilizes two filler metals with a single sub-arc torch 213. In such welding both filler metals (electrodes) are passed through the same torch (e.g., 213) and a single power supply (e.g., 307) supplies a single welding waveform to the torch. Such processes are known by those of skill in the art.

Additionally, in an alternative exemplary embodiment, the sub-arc torches 213/215 can be angled to the sides of the centerline of the weld bead to increase the width of the bead 217, if desired. In such a configuration, at least one (or all) of the torches 213/215 is angled such that its respective filler metal 214/216 is deposited into the weld bead 217 off the centerline of the weld bead (while still being in a common weld puddle).

As explained previously, the sub-arc welding process will consume at least a portion of the GMAW weld bead 209 (103 in FIG. 1B). This consumption can be as much as 100% of the GMAW weld bead 209. Thus, as shown in FIG. 2 the creation of the sub-arc weld bead 217 will consume at least a portion (or all) of the weld bead 209.

Figure 3:
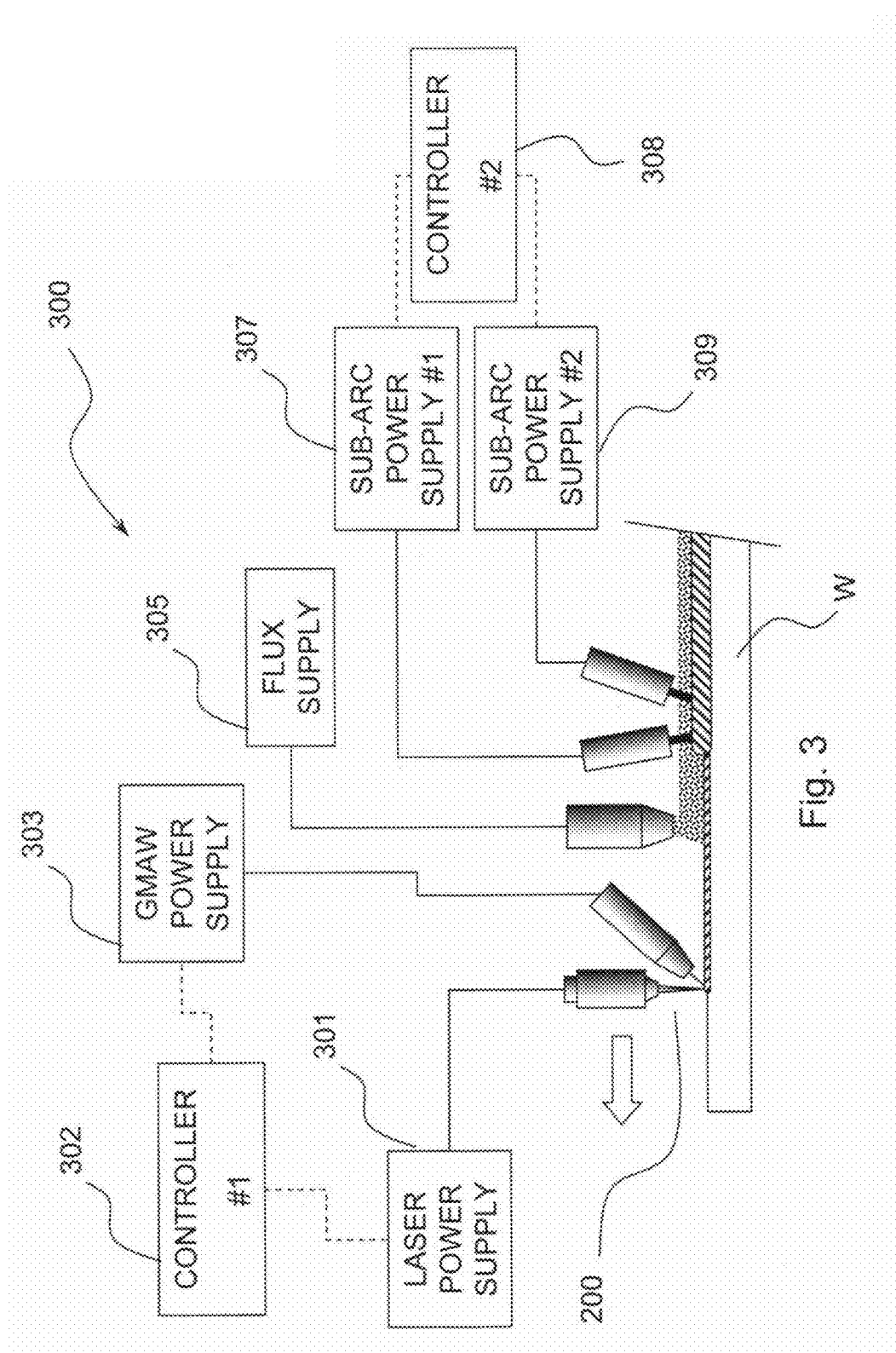
FIG. 3 illustrates a diagrammatical representation of an exemplary embodiment of a welding system in accordance with an exemplary embodiment of the present invention.

Turning now to FIG. 3, an exemplary embodiment of a welding system 300 in accordance with an exemplary embodiment of the present invention is shown. The system shown depicts the various power supplies employed to facilitate a welding operation in accordance with exemplary embodiments of the present invention. It is noted that not shown in FIG. 3 are any wire feeding devices for the GMAW/MIG or sub-arc welding operations. The construction and operation of such devices are known and it is not necessary to describe their operation herein. However, it is well understood by those of ordinary skill in the art that GMAW/MIG and sub-arc welding operations employ the use of wire feeding devices to deliver the filler metals to the respective welding torches.

As shown in FIG. 3, a laser power supply 301 is electrically coupled to the laser device 201 to operate and provide power to the laser device 201. Such power supplies are known. It is noted that in some exemplary embodiments the laser device 201 and its power supply 301 may be integrally manufactured within a single housing or unit. However, it is also contemplated that due to various design constraints, for example space, it may be necessary to locate the laser power supply 301 remotely from the laser device 201.

A GMAW power supply 303 is electrically coupled to the GMAW torch 203 to provide a GMAW/MIG welding signal to the torch 203 to facilitate the GMAW/MIG welding operation. The power supply 303 can be of any known type or construction and can be capable of performing various types of welding operations, including but not limited to pulse welding and/or surface tension transfer welding. For example, a Power Wave® 455M power supply manufactured by The Lincoln Electric Company of Cleveland Ohio can be utilized as the GMAW power supply 303. Of course, this power supply is merely exemplary in nature and the present invention is not limited to the utilization of this specific power supply.

Of course, it is known by those of ordinary skill in the art that a shielding gas is typically used when performing GMAW/MIG welding operation, such as that contemplated by exemplary embodiments of the present invention. Such shielding gases can include carbon dioxide, argon, helium, and mixtures thereof. For clarity the shielding gas supply to the torch 203 is not shown in FIG. 3. However, embodiments of the present invention will have a shielding gas source and supply system to deliver shielding gas to the GMAW welding process to ensure that the GMAW arc is properly shielded. It is noted that shielding gas should not be utilized which interferes with the operation of the laser 201. For example, the use of certain shielding gasses, such as helium, is needed with $CO_2$ type lasers to suppress the plasma created by the laser, thus limiting usage. However, such shielding gas issues can be mitigated with the use of fiber laser technology. Further, in other exemplary embodiments a welding fume extraction system (not shown) can be utilized to extract any welding fumes from the welding operation. Such systems are known and will not be discussed further herein.

Coupled to the flux nozzle 211 is a flux source 305. The source 305 contains the flux F used during the welding operation.

The leading sub-arc torch 213 is coupled to a first sub-arc power supply 307 and the trailing sub-arc torch 215 is coupled to a second sub-arc power supply 309. The sub-arc power supplies 307/309 can be of any known sub-arc power supply system. Such systems are known in the welding industry. For example a Power Waves AC/DC 1000® SD system can be utilized, which is manufactured by The Lincoln Electric Company of Cleveland, Ohio. Of course, this power supply is merely exemplary in nature and the present invention is not limited to the utilization of this specific power supply.

In an exemplary embodiment of the present invention using multiple torches (as shown in FIG. 3), the sub-arc welding processes of the respective power supplies 307/309 are the same. For example, in a tandem configuration, with two sub-arc welding torches, both operations can be DC or AC welding. However, in other exemplary embodiments it may be beneficial to utilize different welding parameters or waveforms. For example, in some exemplary embodiments it is beneficial to have the lead sub-arc welding electrode (filler metal) to have a DC+ polarity while the trailing electrode is operating in an AC or variable polarity mode. Such a configuration would increase the overall penetration of the sub-arc welding process into the work piece W. Alternatively, when using a process in which both sub-arc welding waveforms are AC, an exemplary embodiment can utilize an AC waveform for the leading torch 213 having a higher positive component (in either amplitude or time, or both) than the trailing torch 215 to increase penetration. Of course, it is also contemplated that the trailing sub-arc welding utilizes an AC waveform with a higher positive component if desired. The use of an increased positive component in an AC waveform would not only result in a higher penetration rate but would also result in higher heat input into the weld and thus may improve weld bead appearance. Moreover, in other exemplary embodiments the current magnitudes of the respective sub-arc processes can be different. For example, exemplary embodiments utilize a leading sub-arc welding current which is higher than the trailing sub-arc welding current. Such a configuration allows the leading sub-arc process to provide deeper penetration and then the trailing sub-arc is used to provide additional filler material. In an exemplary embodiment of the present invention the leading sub-arc welding process has an average current level in the range of 750 and 1,000 amps and the trailing sub-arc welding process has an average current level in the range of 600 to 800 amps. In another exemplary embodiment, the leading sub-arc welding process has an average current level in the range of 50 to 150 amps greater than that of the trailing sub-arc welding process.

In another exemplary embodiment of the present invention, the trailing sub-arc welding waveform can have a larger negative component than the leading sub-arc welding waveform. In such a configuration a high deposition rate can be achieved with less welding current, as the trailing sub-arc process is used as primarily the fill process.

Of course, to the extent a single sub-arc torch 213 is utilized then only a single power supply 307 is needed. In other exemplary embodiments utilizing more than two sub-arc torches, a sub-arc welding power supply is to be provided for each sub-arc torch.

In an exemplary embodiment of the present invention, the wire feed speeds, of the respective filler metals 213/214, in a tandem or multi-torch configuration are the same. However, in other exemplary embodiments the wire feed speeds of the respective filler metals 214/216 is different. For example, in some exemplary embodiments the lead filler metal 214 has a higher wire feed speed than the trail filler metal 216. The relative wire feed speeds can be adjusted to achieve an optimal weld bead profile.

As shown in the exemplary embodiment in FIG. 3, a first controller 302 is coupled to each of the laser power supply 301 and the GMAW power supply 303. The controller 302 is used to synchronize operation of the power supplies 301/303. For example, the controller 302 is utilized to synchronize the turning on and off of the respective power supplies 301/303 so that the operations are appropriately synced. Although FIG. 3 depicts the controller 302 as a separate component, it is contemplated that the controller 302 can be made integral to the control of one of the laser power supply 301 or the GMAW power supply 303 such that a physical separate controller 303 is unnecessary. Similarly, in an exemplary embodiment the sub-arc power supplies 307/309 are coupled to a common controller 308 which synchronizes the operation of the power supplies 307/309. Such controllers are known and their structure and operation need not be described in detail. Again, as with the controller 302 the controller 308 can be made integral with the control electronics of any one of the sub-arc power supplies 307 or 309.

Furthermore, in another exemplary embodiment a master controller (not shown) can be utilized which synchronizes the operation of all of the power supplies 301, 303, 307 and 309. Such synchronization can ensure that each of the power supplies are turned on and off simultaneously, or at specific intervals. For example, because of the distances between the laser/GMAW and sub-arc welding processes it may be desirable to turn on and off the sub-arc power supplies 307/309 at some interval after the laser and GMAW power supplies 301/303 are turned on and off. This ensures that each of the respective welding operations cover the same portion of the weld joint.

Turning now to FIG. 4, an exemplary embodiment of a carriage assembly 400 is depicted. The carriage assembly 400 contains a support structure 401 to which each of the laser device 201, GMAW torch 205, nozzle 211, first sub-arc torch 213 and second sub-arc torch 215 are secured for operation. The components can be secured to the structure via fasteners 403, or any feasible connection devices which secure the components as desired. In some exemplary embodiments the carriage assembly 400 is moved in the travel direction during welding, while in other exemplary embodiments the carriage assembly 400 is fixed and the work piece W is moved during welding. In the exemplary embodiments where the assembly 400 is movable it is contemplated that other components are secured to the structure 401 to facilitate operation. For example, wire feeders, wire feeding spools and a flux source 305 can be secured to the structure 401 so as to move with the carriage 400. The carriage assembly 400 can also be provided with rollers or wheels (not shown) to aid in stabilizing movement along the work piece W. The various structure and configuration of the assembly 400 and the structure 401 can be customized as needed for a specific operation.

As shown in FIG. 4, there is a distance D between the points A and B, where point A is the point on the work piece W where the GMAW filler material 207 is deposited into the weld and the point B is the point on the work piece W where the leading sub-arc filler material 214 is deposited into the weld. This distance can be referred to as the trailing distance. In an exemplary embodiment the distance D is at least 6 inches. In a further embodiment the distance D is in the range of 6 to 12 inches. In other exemplary embodiments the distance D can be longer or shorter than the above range, that is less than 12 inches. However, if the distance D is shorter than D it will be necessary to ensure that the flux F can be sufficiently delivered to the weld to shield the sub-arc welding process, while at the same time not interfering with the hybrid laser-GMAW welding operation.

In some exemplary embodiments, a divider 405 can be coupled to either the structure 401 and/or the nozzle 211 which provides a barrier between the nozzle 211 and the hybrid laser-GMAW welding process to prevent the flux F from interfering with the upstream welding operation. The divider 405 is situated such that it sufficiently prevents flux F from flowing into the laser-GMAW welding process and can allow the distance D to be reduced. This can permit a trailing distance of less than 6 inches.

In the exemplary embodiment shown in FIG. 4 each of the components are fixedly secured to the structure 401. However, in other exemplary embodiments any or all of the components 201, 205, 211, 213, and 215 can be positionable to allow for easy modification for different welding processes. For example, the torches 205, 213 and 215 can be secured with connections that permit rotation and or linear movement. The rotation can allow the torches to be repositioned as desired and the linear movement can permit easy stick-out distance adjustments. Such positionability increases the flexibility of the carriage assembly 400. In a further exemplary embodiment the sub-arc torches 213/215 can be secured to the structure 401 with a positionable attachment such that the torches 213/215 can be angled to weld off-center from the centerline of the weld. For example, a side-to-side pivoting type attachment (e.g., a gimble) can be utilized to allow the torches 213/215 to be positioned to increase the width of the weld bead by angling the torches 213/215 to weld off-center of the weld.

The embodiments discussed above focused on the use of a hybrid laser-GMAW system with sub-arc welding, as in many applications the additional filler material from the GMAW welding process may be needed for the first welding pass. However, this may not always be necessary. Specifically, exemplary embodiments of the present invention may not require the GMAW welding process, such that an embodiment only employs the laser welding and sub-arc welding processes described above. In such an embodiment the laser and sub-arc processes and components operate as described above. In such embodiments, the gap G is small such that the lands L of the respective work pieces W are nearly touching (or are touching). In such situations the need for additional filler material from a GMAW/MIG process may not be necessary such that the laser weld will be sufficient to join the work pieces W without the need for filler material. However, in such a system the land height L should be substantially filled with the laser weld 101 such that the following sub-arc welding process will completely fill the weld joint and no gaps will exist between the sub-arc weld bead 217 and the laser weld 101. To ensure that such a result is attained it is desirable if said sub-arc weld bead 105/217 consumes at least a portion of said laser weld 101 (similar to that described above with regard to the GMAW weld bead 103). In an exemplary embodiment, the sub-arc welding process is such that at least 5% of the cross-section of the laser weld 101 is consumed by the sub-arc weld bead 217/105. An advantage of this embodiment is that the trail distance (between the laser contact point and point B) can be further reduced than that which may be achieved when using a GMAW welding process in conjunction with the laser 201.

The remaining aspects of this described embodiment are similar to that described above with respect to the remaining embodiments.

As described above, welding with exemplary embodiments of the present invention results in an improved welding process for heavy plate welding operations. That is, a combination of improved travel speed and deposition rate is achieved, while avoiding weld deficiencies and insufficient sidewall weld penetration. Thus, the exemplary embodiments of the present invention result in an improvement over known heavy plate welding processes.

It is noted that that because of the proximity of the sub-arc welding processes to the GMAW/MIG (or other) welding process certain arc stability issues may arise in various exemplary embodiments. For example, because of the proximity of the various welding processes issues of arc interference, arc blow, and arc sensing may be experienced. That is, it may be found that the sub-arc welding processes may cause arc sensing issues with the GMAW power supply 303 during welding. However, such issues can be addressed and mitigated in a number of ways. For example, control of the current path for each of the welding processes can be obtained through the optimal placement of the welding ground lead locations. By selecting appropriate ground lead locations, particularly for the sub-arc welding processes, current path interference can be minimized. In an exemplary embodiment of the present invention, the sub-arc welding process ground lead location travels with the welding process, while maintaining electrical contact with the work piece W. In such an embodiment, this ensures that the distance from the sub-arc process to the ground lead remains constant to maintain a stable ground current path. Similarly, the ground lead location for the GMAW/MIG welding process can be made to "travel" with the welding process such that the current path of that process also remains constant and stable, to minimize interference. In further exemplary embodiments, placement of power supply voltage lead locations can be optimized, similar to the ground lead locations discussed above.

In further exemplary embodiments, a magnetic field steering unit can be utilized to magnetically steer or otherwise control/stabilize the welding arcs. It is generally known that magnetic steering units can be utilized to stabilized welding arcs, and in particular address arc blow issues. Such technology is generally known and need not be discussed in detail herein. For example, in an exemplary embodiment a magnetic arc steering unit is positioned in between the first pass and sub-arc welding processes to magnetically shield the respective welding processes.

Additionally, further embodiments of the present invention can utilize welding synchronization between the various welding processes to minimize arc interference. For example, if the GMAW/MIG process is a DC pulse mode welding process and at least one of the sub-arc welding processes is AC then these processes can be synchronized such that the pulse peak of the GMAW/MIG pulse is synchronized with the AC waveform(s) of the sub-arc process to optimize welding performance.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:

1. A welding apparatus for welding heavy plate work pieces, said welding apparatus comprising:
a laser welding device which directs a laser beam to a first weld puddle of said work piece to weld at least a portion of said work piece;
a welding torch located adjacent to said laser welding device so as to direct a first welding electrode to said first weld puddle while said laser beam is being directed to said first weld puddle, where said welding torch deposits said first welding electrode to create a first weld bead onto said portion welded by said laser welding device;
a flux nozzle which deposits a welding flux onto said first weld bead; and
at least two submerged arc welding torches which, subsequent to creating said first weld bead by said laser welding device and said welding torch, direct a corresponding submerged arc filler metal to said first weld bead to create a second weld bead through a submerged arc welding process in which said at least two submerged arc welding torches share a common weld puddle, wherein said at least two submerged arc welding torches are positioned at an angle with respect to each other such that the respective submerged arc filler metal of said at least two submerged arc welding torches shares said common weld puddle during said submerged arc welding process, and
wherein said submerged arc welding process melts at least a portion of said first weld bead to consume said melted portion into said second weld bead.

2. The apparatus of claim 1, wherein a trailing distance between said first welding electrode and said submerged arc filler metal is in the range of 6 to 12 inches.

3. The apparatus of claim 1, wherein each of said laser welding device, said welding torch, and said at least two submerged arc welding torches are secured to a common support structure.

4. The apparatus of claim 1, wherein said submerged arc welding process melts 100% of said first weld bead to consume said melted first weld bead into said second weld bead.

5. A welding system for welding heavy plate work pieces, said welding system comprising:
a laser welding device which directs a laser beam to a first weld puddle of said work piece to weld at least a portion of said work piece;
a welding torch located adjacent to said laser welding device so as to direct a first welding electrode to said first weld puddle while said laser beam is being directed to said first weld puddle, where said welding torch deposits said first welding electrode to create a first weld bead onto said portion welded by said laser welding device;
a first welding power supply coupled to said welding torch to provide a first welding signal to said welding torch;
a flux nozzle which deposits a welding flux onto said first weld bead;
at least two submerged arc welding torches which, subsequent to creating said first weld bead by said laser welding device and said welding torch, direct a corresponding submerged arc filler metal to said first weld bead to create a second weld bead through a submerged arc welding process in which said at least two submerged arc welding torches share a common weld puddle, wherein said at least two submerged arc welding torches are positioned at an angle with respect to each other such that the respective submerged arc filler metal of said at least two submerged arc welding torches shares said common weld puddle during said submerged arc welding process; and
a submerged arc welding power supply system coupled to said at least two submerged arc welding torches to provide submerged arc welding signals respectively to said submerged arc welding torches for said submerged arc welding process,
wherein said submerged arc welding process melts at least a portion of said first weld bead to consume said melted portion into said second weld bead.

6. The system of claim 5, wherein a trailing distance between said first welding electrode and said submerged arc filler metal is in the range of 6 to 12 inches.

7. The system of claim 5, wherein each of said laser welding device, said welding torch, and said at least two submerged arc welding torches are secured to a common support structure.

8. The system of claim 5, wherein said submerged arc welding process melts 100% of said first weld bead to consume said melted first weld bead into said second weld bead.

9. The apparatus of claim 1, wherein said laser welding device includes a focusable and adjustable beam lens.

10. The apparatus of claim 1, wherein said laser beam directed by said laser welding device and said first weld electrode forms an angle ranging from 30 to 60 degrees.

11. The apparatus of claim 1, wherein said laser welding device leads said welding torch in a travel direction of said welding apparatus during welding.

12. The apparatus of claim 1, wherein said laser welding device has a power ranging from 6 to 20 kW.

13. The system of claim 5, wherein said laser welding device includes a focusable and adjustable beam lens.

14. The system of claim 5, wherein said laser beam directed by said laser welding device and said first weld electrode forms an angle ranging from 30 to 60 degrees.

15. The system of claim 5, wherein said laser welding device leads said welding torch in a travel direction of said welding apparatus during welding.

16. The system of claim 5, wherein said laser welding device has a power ranging from 6 to 20 kW.

17. The apparatus of claim 1, wherein said submerged arc welding process melts over 50% of said first weld bead to consume said melted first weld bead into said second weld bead.

18. The system of claim 5, wherein said submerged arc welding process melts over 50% of said first weld bead to consume said melted first weld bead into said second weld bead.

19. The system of claim 5, said first welding signal is synchronized to said submerged arc welding signals to minimize arc interference.

* * * * *